Sept. 8, 1925.

D. A. RICH

HARROW

Filed Sept. 18, 1923

1,552,756

2 Sheets-Sheet 1

Inventor
David Albert Rich
by P. Singer
Atty

Sept. 8, 1925.  1,552,756
D. A. RICH
HARROW
Filed Sept. 18, 1923 2 Sheets-Sheet 2

Inventor
David Albert Rich
by B. Singer atty

Patented Sept. 8, 1925.

1,552,756

UNITED STATES PATENT OFFICE.

DAVID ALBERT RICH, OF WELLINGTON, NEW SOUTH WALES, AUSTRALIA.

HARROW.

Application filed September 18, 1923. Serial No. 663,433.

*To all whom it may concern:*

Be it known that I, DAVID ALBERT RICH, a subject of the King of Great Britain and Ireland, and resident of Wellington, in the State of New South Wales, Commonwealth of Australia, have invented certain new and useful Improvements in Harrows (for which I have filed application in Australia, No. 9,338, on the 6th October, 1922), of which the following is a specification.

The object of this invention is to provide an improved type of harrow for use in conjunction with a plough, seed-drill, fertilizer distributor or like agricultural implement, which will be light of traction, capable of self clearance of matter tending to clog it and of automatic adjustment to surface inequalities.

The most essential element of novelty in my invention is that it is so constructed that in operation the row or rows of tines are disposed at an acute angle to the line of progression thus permitting clogging obstructions to pass freely along the front of the row of tines.

Another feature of the invention is that the angularity of the row of tines may be varied at will and by so doing the width of the ground covered in one passage of the harrow is readily increased or diminished as desired. Such variation of angularity also results in a variation of the spacing of the tines (measured at right angles to the line of progression), the more acute the angle being to said line, the closer being the effective spacing of the tines, and vice versa.

A further feature of my invention is the formation of the tines and the method of and means for attaching them to the frame bars of the harrow. This feature eliminates the usual method of screwing the tines into the frame, and enables a broken or bent tine to be easily removed and another fitted in its place.

Figure 1:
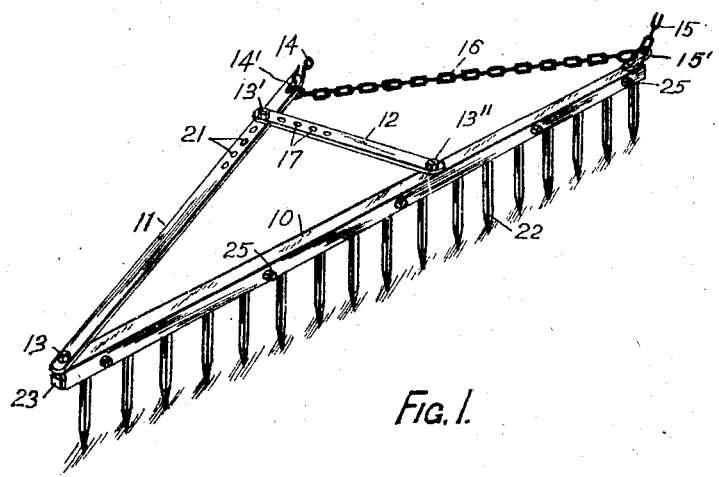
Figure 2:
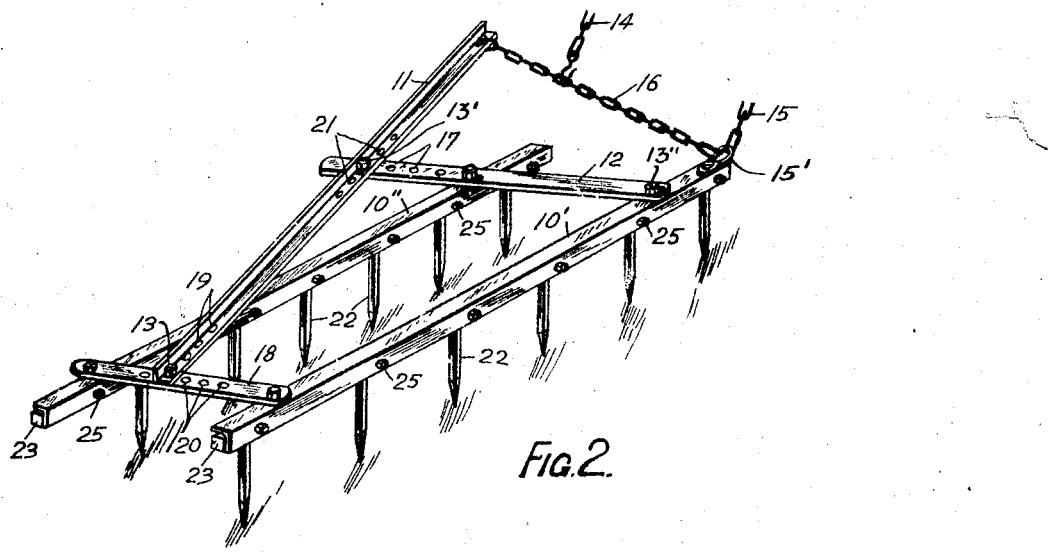
Figure 3:
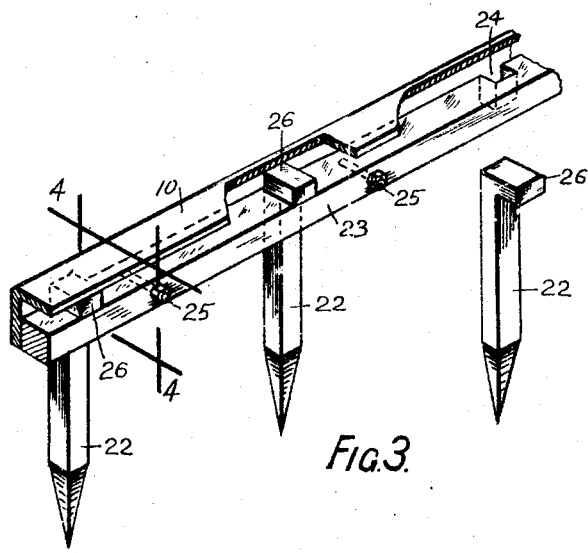
Figure 4:
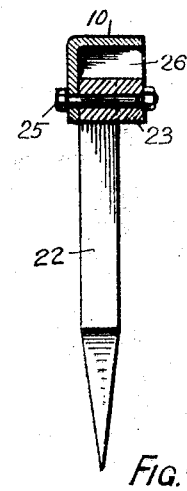
Figure 5:
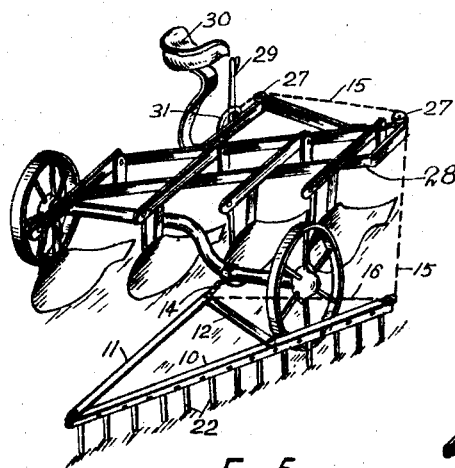
Figure 6:
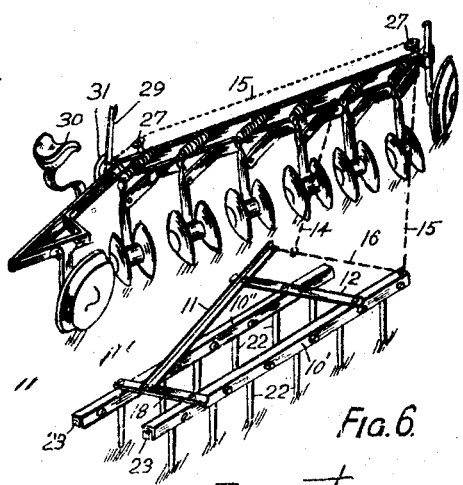

I will now fully describe my invention by reference to the accompanying drawings which depict the construction of the harrow in modified forms and its application in several ways. In the drawings Fig. 1 is a perspective view of a simple form of harrow showing the drag chains by which it is attached to the implement behind which it is to operate. Fig. 2 is a similar view of a modified form. Fig. 3 shows a section of a tine-bar, a locking bar associated therewith, two tines in place and a third tine removed therefrom. Fig. 4 is a sectional elevation on plane 4. 4. of Fig. 3. Fig. 5 illustrates a method of attaching a simple form of my harrow behind a gang mould-board plough which is shown in part only. Fig. 6 shows a method of attaching the modified form of my harrow behind a gang disc plough which is shown in part only.

Referring to Fig. 1 the harrow comprises a triangular frame composed of a tine bar 10, drawbar 11 and stay bar 12, these three members being pivotally secured to each other by means of bolts 13, 13' and 13". To the front end of the draw-bar a draw chain 14 is releasably fastened by engagement in an eye 14', the other end of said chain being attached in any suitable manner to the preceding implement, for example as shown in Fig. 5. To the front end of the tine-bar 10 is an eye 15' and to this is attached a chain 15 the other end of which is attached to the preceding implement in any suitable manner permitting length adjustment, for example as shown in Figs. 5 and 6 to which reference is hereinafter made. The respective front ends of draw-bar 11 and tine-bar 10 are connected by an open link chain 16 which serves as a means for attaching the draw chain 14 at any selected point on chain 16 as shown in Fig. 2 for example. The stay-bar 12 has, at the end adjacent to the draw bar 11, a series of holes 17 any one of which may be brought into register with any one of the series of holes 21 in the drawbar for the reception of the adjacent bolt 13' so that by this adjustment the shape of the frame may be varied within limits. By so doing the angle of the tine bar to the line of draft is varied. This latter variation may be accomplished in another way without altering the shape of the frame, as hereinafter explained.

Referring now to Fig. 2, there is provided an additional tine-bar 10" parallel to the other and crossing the drawbar 11. A crossbar 18 pivotally connects the rear ends of said tine bars while the forward end of bar 10" is pivotally connected to the stay bar 12. The bolt 13 may be passed through anyone of the series of holes 19 in the rear end of said draw bar, and through anyone of the series of holes 20 in cross bar 18. Similarly the bolt 13' may be passed through anyone of the series of holes 21 in the draw bar and any one of the series of holes 17 in the cross bar 12. Thus the angle of the tinebars to the draw-bar may be adjusted as desired, and the angle of the parallel stay-bars 12 and 18 to the tine-bars may be varied so as to cause said tine bars to be more closely or more widely spaced as may be desired.

The construction of the tines 22 and the means for attaching them are illustrated in Figs. 3 and 4. The tine bar 10 is of angle section, and within the angle is a locking bar 23 provided at intervals with notches 24 and secured to the vertical web of the tine-bar by bolts 25. Each tine is formed with an offset head 26 similar to an ordinary dog-spike, and said head fits between the locking bar 23 and the horizontal web of the tine-bar, while the shank of the tine fits in one of the notches 24 in the locking bar. Thus the tines are firmly secured but are readily detachable.

Referring to Fig. 5, wherein a harrow according to this invention is attached to a gang mould-board plough part of which is shown, the draw chain 15 passes round a pair of pulleys 27 affixed in any conveniently suitable position on the plough frame 28, and is connected to an operating lever 29 located near the driver's seat 30 and associated with a quadrant 31. By movement of this lever the angle of the tine-bar to the line of progression may be varied.

Referring to Fig. 6 the same arrangement is employed and corresponding parts are indicated by corresponding numerals.

What I claim and desire to secure by Letters Patent is:

1. A harrow of which the frame, substantially triangular in form with its apex at the rear, comprises a draw-bar, a tine-bar disposed at an angle to said draw-bar and having a series of tines affixed thereto, and a stay-bar connecting said draw-bar and tine-bar near the forward ends thereof, said draw-bar having at its forward end means for attaching draft gear, and said tine-bar having at its forward end means for attaching a flexible adjusting connection for maintaining the tine-bar in desired angular disposition to the line of progression of the harrow.

2. A harrow with substantially triangular frame comprising a draw-bar, a tine-bar disposed at an angle to said draw-bar, a stay bar connecting said draw-bar and tine-bar near the forward ends thereof, and means for adjusting the effective length of said staybar and thereby varying the angularity of the tinebar relatively to the drawbar, said draw bar having at its forward end means for attaching draft gear, and said tine-bar having at its forward end means for attaching a flexible adjusting connection for maintaining the tine-bar in desired angular disposition to the line of progression of the harrow.

Signed at Wellington New South Wales this thirty-first day of July A. D. 1923.

DAVID ALBERT RICH.